(12) United States Patent
Chen

(10) Patent No.: US 12,407,459 B2
(45) Date of Patent: Sep. 2, 2025

(54) METHOD USED FOR TRANSMITTING DATA, AND TERMINAL DEVICE

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 645 days.

(21) Appl. No.: 17/545,863

(22) Filed: Dec. 8, 2021

(65) Prior Publication Data

US 2022/0103325 A1 Mar. 31, 2022

Related U.S. Application Data

(63) Continuation of application No. PCT/CN2019/097713, filed on Jul. 25, 2019.

(51) Int. Cl.
*H04J 13/16* (2011.01)
*H04L 5/00* (2006.01)

(52) U.S. Cl.
CPC ............ *H04L 5/0048* (2013.01); *H04J 13/16* (2013.01)

(58) Field of Classification Search
None
See application file for complete search history.

(56) References Cited

U.S. PATENT DOCUMENTS

| | | | |
|---|---|---|---|
| 2018/0343653 A1 | 11/2018 | Guo | |
| 2019/0166615 A1 | 5/2019 | Nimbalker et al. | |
| 2019/0296876 A1* | 9/2019 | Zhang | H04L 5/0048 |
| 2020/0221487 A1* | 7/2020 | Lee | H04L 5/0091 |
| 2022/0021499 A1* | 1/2022 | Jiang | H04L 1/08 |

(Continued)

FOREIGN PATENT DOCUMENTS

| | | |
|---|---|---|
| CN | 108199819 A | 6/2018 |
| CN | 109661791 A | 4/2019 |

(Continued)

OTHER PUBLICATIONS

Extended European Search Report for European Application No. 19938465.2, dated May 11, 2022.

(Continued)

*Primary Examiner* — Kodzovi Acolatse
(74) *Attorney, Agent, or Firm* — Sheppard, Mullin, Richter & Hampton LLP

(57) ABSTRACT

A method for transmitting data includes: a terminal device receives DCI, wherein the DCI is used for scheduling PDSCH transmission in multiple time domain resource units, and the DCI is further used for indicating K TCI states, and K is a positive integer; and the terminal device determines, from the K TCI states, a TCI state used for the PDSCH transmission in the multiple time domain resource units according to at least one of following information: the number of CDM groups to which an adopted DMRS port belongs, a configuration of PDSCH repetition transmission scheme, a configuration scheme for the number of the multiple time domain resource units, and a physical resource configuration in one time domain resource unit of the multiple time domain resource units.

16 Claims, 8 Drawing Sheets

(56) References Cited

U.S. PATENT DOCUMENTS

| | | | |
|---|---|---|---|
| 2022/0104237 A1* | 3/2022 | Muruganathan | H04L 5/0023 |
| 2022/0124761 A1* | 4/2022 | Muruganathan | H04L 5/0051 |
| 2022/0124768 A1* | 4/2022 | Frenne | H04L 1/1819 |
| 2022/0150930 A1* | 5/2022 | Song | H04W 72/1273 |
| 2022/0191892 A1* | 6/2022 | Muruganathan | H04B 7/0695 |
| 2022/0256573 A1* | 8/2022 | Frenne | H04L 5/0053 |

FOREIGN PATENT DOCUMENTS

| | | |
|---|---|---|
| CN | 109802787 A | 5/2019 |
| CN | 109803427 A | 5/2019 |
| CN | 109962765 A | 7/2019 |
| CN | 110034853 A | 7/2019 |
| WO | WO 2019066618 A1 | 4/2019 |
| WO | WO 2019099659 A1 | 5/2019 |
| WO | WO 2019/130847 A1 | 7/2019 |
| WO | WO 2020/164014 A1 | 8/2020 |

OTHER PUBLICATIONS

First Office Action issued in Indian Patent Application No. 202117057064, mailed on Jun. 14, 2022.
CATT, R1-1904561, Consideration on multi-TRP/panel transmission, 3GPP TSG RAN WG1 #96bis, Xi'an, China, Apr. 8-12, 2019.
Huawei, HiSilicon, RI-1907706, Summary of AI: 7.2.8.2 Enhancements on Multi-TRP/Panel Transmission of Offline Discussion, 3GPP TSG RAN WGI Meeting #97, Reno, USA, May 13-17, 2019.
First Office Action issued in CN Patent Application No. 202111681387. 8, mailed Feb. 23, 2023.
Notification to Grant an Invention Patent in CN Patent Application No. 202111681387.8, mailed Apr. 28, 2023.
Analysis on massive beamforming in the 5G NR dated Nov. 11, 2018.
Moderator (OPPO), R1-200xxxx, Discussion in Email Thread #6, 3GPP TSG RAN WG1 #102, e-Meeting, Aug. 17-28, 2020.
Notice of Reasons for Refusal issued in Japanese Patent Application No. 2021-575485, dated May 19, 2023, 10 pages.
Ericsson, R1-1900728, On multi-TRP and multi-panel, 3GPP TSG RAN WG1 Meeting Ad-Hoc Meeting 1901 Taipei, Taiwan, Jan. 21-25, 2019.
OPPO, R1-1904036, Enhancements on multi-TRP and multi-panel transmission, 3GPP TSG RAN WG1 Meeting #96bis Xi'an, China, Apr. 8-12, 2019.
NTT Docomo, Inc, R1-1904966, Enhancements on multi-TRP/ panel transmission, 3GPP TSG RAN WG1 #96bis R1-1904966 Xi'an, China, Apr. 8-12, 2019.
Vivo, R1-1906159, Further discussion on Multi-TRP/Panel transmission, 3GPP TSG RAN WG1 #97 Reno, USA, May 13-17, 2019.
International Search Report of PCT/N2019/097713, mailed from China National Intellectual Property Administration on Apr. 24, 2020.
Ericsson, "On DMRS groups in Rel-15", R1-1806222, 3GPP TSG-RAN WG1 Meeting #93, Busan, Korea. May 21-25, 2018.
OPPO, "Enhancements on multi-TRP and multi-panel transmission", R1-1906287, 3GPP TSG RAN WG1 Meeting #97, Reno, USA, May 13-17, 2019.
Qualcomm Incorporated, "Multi-TRP Enhancements", R1-1907289, 3GPP TSG-RAN WG1 Meeting #97, May 13-17, 2019, Reno, Nevada, USA.
Notice of Preliminary Rejection of Korean application No. 10-2021-7042981 issued on Oct. 23, 2025, 13 pages with English translation.

* cited by examiner

200
A terminal device receives downlink control information (DCI), wherein the DCI is used for scheduling physical downlink shared channel (PDSCH) transmission in multiple time domain resource units, and the DCI is further used for indicating K transmission configuration indicator (TCI) states, with K being a positive integer — S210

The terminal device determines from the K TCI states a TCI state used for the PDSCH transmission in the multiple time domain resource units according to at least one of following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units — S220

FIG. 7

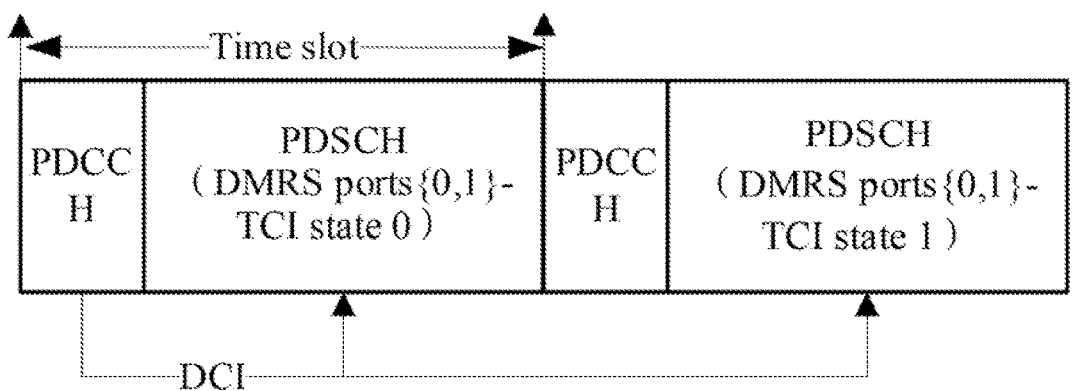

DCI indicated TCI states{0,1} and DMRS ports{0,1}

FIG. 8

METHOD USED FOR TRANSMITTING DATA, AND TERMINAL DEVICE

CROSS-REFERENCE TO RELATED APPLICATION

The present application is a continuation application of the International PCT Application No. PCT/CN2019/097713, having an international filing date of Jul. 25, 2019, the entire content of which is hereby incorporated by reference.

TECHNICAL FIELD

Embodiments of the present application relate to the field of communications, and more particularly, relate to a method for transmitting data, and a terminal device.

BACKGROUND

In a New Radio (NR) system, a network side may configure a corresponding Transmission Configuration Indicator (TCI) state for each downlink signal or downlink channel, for indicating a Quasi Co-location (QCL) reference signal corresponding to a target downlink signal or a target downlink channel, so that a terminal receives the target downlink signal or the target downlink channel based on the reference signal.

In order to improve transmission reliability of Physical Downlink Shared Channels (PDSCH), repetition transmission of PDSCH is introduced into the NR, i.e., PDSCH carrying the same data is transmitted multiple times through different slots/Transmission/reception points (TRPs)/redundant versions, etc., so as to obtain a diversity gain and reduce a block error rate (BLER).

As to how a terminal device, when configured with multiple time domain resource units, determines a usable TCI state, there is no solution for reference at present.

SUMMARY

Embodiments of the present application provide a method for transmitting data and a terminal device, which facilitate a terminal device, when configured with multiple time domain resource units, to determine a usable TCI state, thereby helping improving performance of PDSCH transmission.

In a first aspect, a method for transmitting data is provided, including: receiving, by a terminal device, downlink control information (DCI), wherein the DCI is used for scheduling physical downlink shared channel (PDSCH) transmission in multiple time domain resource units, and the DCI is further used for indicating K transmission configuration indicator (TCI) states, and K is a positive integer; and determining, by the terminal device, from the K TCI states a TCI state used for the PDSCH transmission in the multiple time domain resource units according to at least one of following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units.

In a second aspect, a terminal device is provided, which is configured to perform the method in the above first aspect or in an implementation mode thereof.

Specifically, the terminal device includes functional modules configured to perform the method in the above first aspect or in an implementation mode thereof.

In a third aspect, a terminal device is provided, including a processor and a memory. The memory is configured to store a computer program, and the processor is configured to call and run the computer program stored in the memory to perform the method in the above first aspect or in an implementation mode thereof.

In a fourth aspect, a chip is provided, which is configured to implement the method in the above first aspect or in various implementation modes thereof.

Specifically, the chip includes a processor, which is configured to call and run a computer program from a memory, to enable a device in which the chip is installed to perform the method in the above first aspect or in various implementation modes thereof.

In a fifth aspect, a computer readable storage medium is provided, which is configured to store a computer program that enables a computer to perform the method in the above first aspect or in various implementation modes thereof.

In a sixth aspect, a computer program product is provided, including computer program instructions that enable a computer to perform the method in the above first aspect or in various implementation modes thereof.

In a seventh aspect, a computer program is provided, wherein when the computer program is running on a computer, the computer is enabled to perform the method in the above first aspect or in various implementation modes thereof.

According to the above technical solution, the terminal device may determine TCI states used for PDSCH transmission in multiple time domain resource units, based on existing configuration information, for example, at least one of the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit, without the need of introducing new signaling, which facilitates to achieve a balance between reliability and throughput in a case where multiple TCI states are configured.

These aspects or other aspects of the present application will be more easily understood from the following description of the embodiments.

BRIEF DESCRIPTION OF DRAWINGS

FIG. 7 is a schematic diagram of a method for transmitting data according to an embodiment of the present application.

FIG. 8 is a schematic diagram of a TCI state mapping mode when the number of CDM groups is equal to 1.

DETAILED DESCRIPTION

Technical solutions in embodiments of the present application will be described below with reference to the drawings of the embodiments of the present application. It is apparent that the embodiments described are just some of the embodiments of the present application, rather than all of the embodiments of the present application. Based on the embodiments of the present application, all other embodiments achieved by a person of ordinary skills in the art without making inventive efforts are within the protection scope of the present application.

It should be understood that the technical solutions of the embodiments of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, New Radio (NR), future 5G System, etc.

In particular, the technical solutions of the embodiments of the present application are applicable to various communication systems based on non-orthogonal multiple access technology, such as a Sparse Code Multiple Access (SCMA) system, and a Low Density Signature (LDS) system, etc. Of course, the SCMA system and the LDS system may also be referred to as other names in the communication field. Further, the technical solutions of the embodiments of the present application are applicable to a multicarrier transmission system employing non-orthogonal multiple access technology, such as an Orthogonal Frequency Division Multiplexing (OFDM) system using the non-orthogonal multiple access technology, a Filter Bank Multi-Carrier (FBMC) system, a Generalized Frequency Division Multiplexing (GFDM) system, a Filtered-OFDM (F-OFDM) system, etc.

Figure 1:
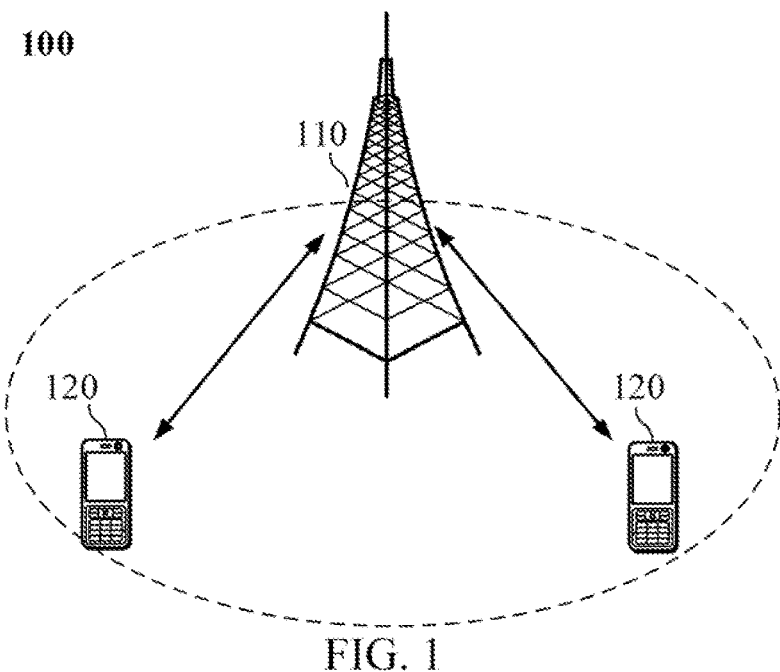
FIG. 1 is a schematic diagram of an architecture of a communication system according to an embodiment of the present application.

Illustratively, a communication system 100 applied in an embodiment of the present application is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system or an Evolutional Node B (eNB or eNodeB) in a LTE system, or a radio controller in a Cloud Radio Access Network (CRAN), or the network device may be a mobile switching center, a relay station, an access point, a vehicle-mounted device, a wearable device, a hub, a switch, a bridge, a router, a network device gNB in a 5G network, or a network device in a future evolved Public Land Mobile Network (PLMN), etc.

The communication system 100 further includes at least one terminal device 120 located within a coverage range of the network device 110. The "terminal device" as used herein includes, but is not limited to, User Equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session initiation Protocol (SIP) phone, a Wireless Local Loop (WLL) station, a Personal Digital Assistant (PDA), a handheld device or a computing device with a wireless communication function or other processing devices connected to a wireless modem, a vehicle-mounted device, a wearable device, a terminal device in a future 5G network, a terminal device in a future evolved Public Land Mobile Network (PLMN), etc., which is not limited in the embodiments of the present application.

Optionally, Device to Device (D2D) communication may be performed between the terminal devices 120.

Optionally, the 5G system or 5G network may also be referred to as a New Radio (NR) system or a NR network.

FIG. 1 exemplarily illustrates one network device and two terminal devices. Optionally, the communication system 100 may include multiple network devices, and other numbers of terminal devices may be included within the coverage range of each network device, which is not limited in the embodiments of the present application.

Optionally, the communication system 100 may further include other network entities, such as a network controller and a mobile management entity, which is not limited in the embodiments of the present application.

It should be understood that a device with a communication function in a network/system in the embodiments of the present application may be referred to as a communication device. Taking the communication system 100 shown in FIG. 1 as an example, the communication device may include a network device 110 and terminal devices 120 which have communication functions. The network device 110 and the terminal devices 120 may be the specific devices described above, which will not be described in detail here. The communication device may also include other devices in the communication system 100, such as a Mobility Management Entity (MME), a Serving Gateway (S-GW) or a PDN Gateway (P-GW), which are not limited in the embodiments of the present application.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is an "or" relation between the associated objects before and after "/".

To facilitate understanding, several important concepts will be introduced below.

1. Downlink Beam Management

Figure 2:
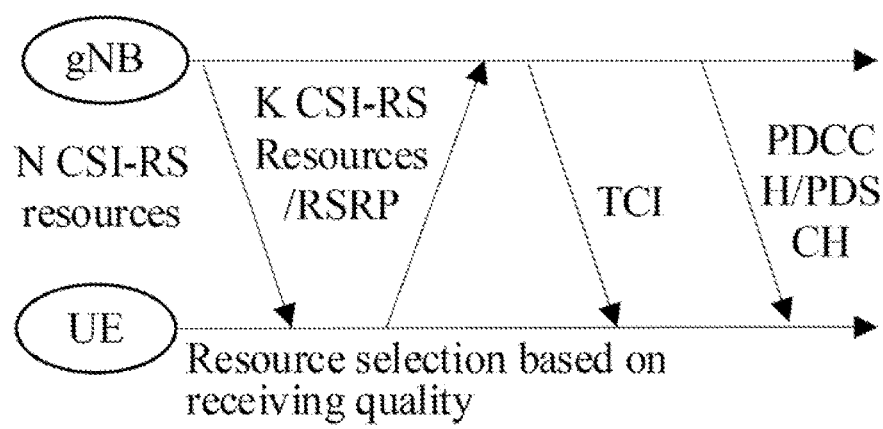
FIG. 2 is a schematic diagram of a process of downlink beam management.

In an NR system, a network side may use analog beams to transmit downlink PDSCH. Before performing analog beam forming, the network side needs to determine beams to be used through a process of downlink beam management. The downlink beam management may be performed based on a Channel State Information Reference Signal (CSI-RS) or a Synchronization Signal Block (SSB). Specifically, as shown in FIG. 2, a network side sends N SSBs or N CSI-RS resources for the beam management, and a terminal performs measurement based on these SSBs or CSI-RS resources, selects K SSBs or CSI-RS resources with the best reception quality from these SSBs or CSI-RS resources, and reports corresponding SSB indexes or CSI-RS resource indexes and corresponding RSRP to the network side. The network side obtains a best SSB or CSI-RS resource according to the report of the terminal, and determines a transmitting beam used by the network side as a transmitting beam used for downlink transmission, so as to use it for transmitting a downlink control channel or a data channel. Before transmitting the downlink control channel or the data channel, the network side indicates a corresponding reference signal to the terminal through a TCI state, so that the terminal may receive a corresponding Physical Downlink Control Channel (PDCCH) or PDSCH by using a receiving beam used for receiving the QCL reference signal previously.

2. QCL (Quasi Co-Location) Indication for Downlink Transmission

In the NR system, the network side may configure a corresponding TCI state for each downlink signal or downlink channel, for indicating a QCL reference signal corresponding to a target downlink signal or a target downlink channel, so that the terminal receives the target downlink signal or the target downlink channel based on the reference signal.

For two antenna ports, if a large-scale characteristic of a radio channel transmitting symbols through one of the antenna ports can be inferred from a radio channel transmitting symbols through the other antenna port, the two antenna ports may be regarded as being quasi co-located. The large-scale characteristic includes at least one of the following parameters: Doppler shift, Doppler spread, average delay, delay spread and Spatial Rx parameter. That is, when the two antenna ports are of QCL, it means that the large-scale characteristic of the radio channel of one antenna port corresponds to the large-scale characteristic of the radio channel of the other antenna port. Considering the multiple antenna ports for transmitting Reference Signals (RSs), when the antenna ports transmitting two different types of RSs are of QCL, the large-scale characteristic of the radio channel of one antenna port may be replaced by the large-scale characteristic of the radio channel of another antenna port.

Assuming that A is a reference signal and B is a target signal, if B is quasi-co-located with A with respect to a large-scale parameter as described above, a UE may estimate the large-scale parameter of quasi-co-location from A, so that B may perform relevant operations using the large-scale parameter. For example, B may obtain channel estimation information, obtain measurement information such as Reference Signal Receiving Power (RSRP), or assist the UE in beamforming, by using the large-scale parameter.

One TCI state may at least include the following configurations: a TCI state identity (ID) for identifying a TCI state, QCL information 1 and QCL information 2. Here, one piece of QCL information may further include the following information: QCL type configuration, which may be one of QCL type A, QCL type B, QCL type C and QCL type D; and QCL reference signal configuration, including an ID of a cell where a reference signal is located, a Bandwidth Part (BWP) ID and a reference signal ID (which may be a CSI-RS resource ID or an SSB index). The QCL type of at least one piece of QCL information among QCL information 1 and QCL information 2 is one of type A, type B and type C, and the QCL type of the other QCL information piece of (if configured) is QCL type D.

Different QCL type configurations are defined as follows:
QCL Type A: {Doppler shift, Doppler spread, average delay, delay spread}
QCL TypeB: {Doppler shift, Doppler spread}
QCL TypeC: {Doppler shift, average delay}
QCL-TypeD: {Spatial Rx parameter}

If the network side configures a QCL reference signal of a target downlink channel as a reference SSB or a reference CSI-RS resource through a TCI state, and the QCL type configuration is type A, type B or type C, then the terminal may assume that the target downlink signal has the same target large-scale parameters (i.e., the above-mentioned large-scale characteristics) as the reference SSB or the reference CSI-RS resource, and therefore the terminal receives the target downlink signal using the same corresponding receiving parameters. The target large-scale parameters are determined by the QCL type configuration. Similarly, if the network side configures the QCL reference signal of the target downlink channel as the reference SSB or the reference CSI-RS resource through a TCI state, and the QCL type configuration is type D, then the terminal may receive the target downlink signal by using the same receiving beam (i.e., Spatial Rx parameter) used for receiving the reference SSB or reference CSI-RS resource. Generally, the target downlink channel and its reference SSB or reference CSI-RS resource are sent by a single TRP, a same panel or a same beam at the network side. If two downlink signals or downlink channels have different transmission TRPs, different transmission panels or different transmitting beams, different TCI states will generally be configured.

Figure 3:
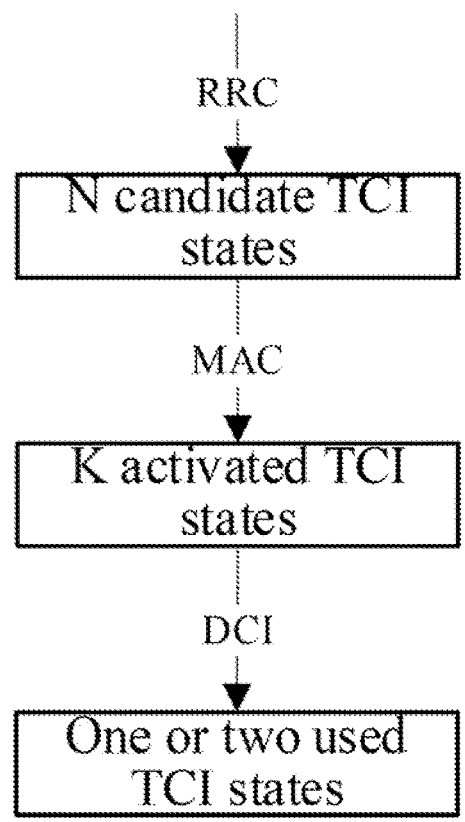
FIG. 3 is a schematic diagram of a method for configuring a TCI state of a PDSCH.

For a downlink control channel, the TCI state may be indicated by Radio Resource Control (RRC) signaling, or by RRC signaling+Media Access Control (MAC) signaling. For a downlink data channel, an available TCI state set (including N candidate TCI states) may be indicated by RRC signaling, some of the TCI states (K activated TCI states) are activated by MAC layer signaling, and finally, one or two TCI states are indicated from the activated TCI states through a TCI state indication field in the Downlink Control Information (DCI), which are used for PDSCH scheduled by the DCI, as shown in FIG. 3.

3. Downlink Incoherent Joint Transmission

Downlink and uplink incoherent transmission based on multiple TRPs are introduced in the NR system. Backhaul connections between the TRPs may be ideal or non-ideal. Information interaction may be performed quickly and dynamically between the TRPs under the ideal backhaul, while information interaction may be performed only quasi-statically between the TRPs under the non-ideal backhaul due to relatively large delays. In the downlink incoherent transmission, different control channels may be used to schedule the transmission of multiple TRPs separately, or a same control channel may be used to schedule the transmission of multiple TRPs. Data of different TRPs use different transport layers, and the latter can only be used in the case of ideal backhaul.

Figure 4:
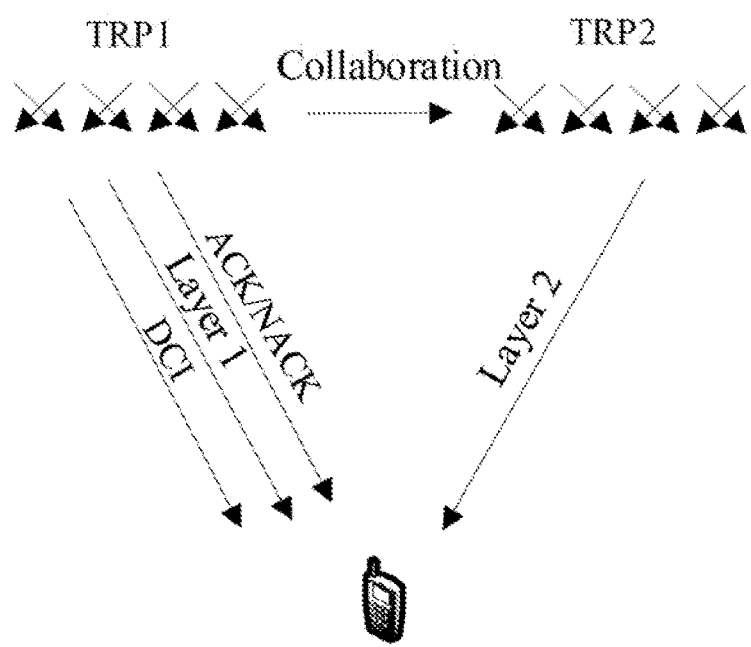
FIG. 4 is a schematic diagram of single PDCCH-based downlink incoherent transmission.

For the multi-TRP downlink transmission (e.g. TRP1 and TRP2 in FIG. 4) scheduled by a single PDCCH, a same DCI may schedule multiple transport layers (e.g., layer 1 and layer 2 in FIG. 4) from different TRPs to transmit in one slot. The transport layers from different TRPs use DMRS ports in different CDM groups and use different TCI states. The network device needs to indicate, in one DCI, the DMRS ports from different CDM groups and the TCI states corresponding respectively to the different CDM groups, so as to support transmission of different DMRS ports with different beams. In this case, report of Hybrid Automatic Repeat Request-Acknowledgement (HARQ-ACK) feedback (ACK/Non-Acknowledgement (NACK)) and Channel State Information (CSI) may reuse the mechanisms in existing protocols.

4. PDSCH Repetition

Figure 5:
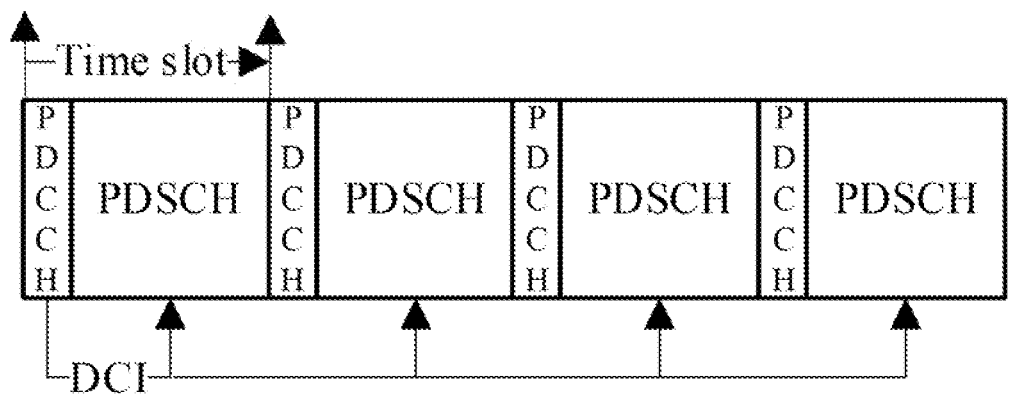
FIG. 5 is a schematic diagram of slot-based PDSCH repetition transmission.
Figure 6:
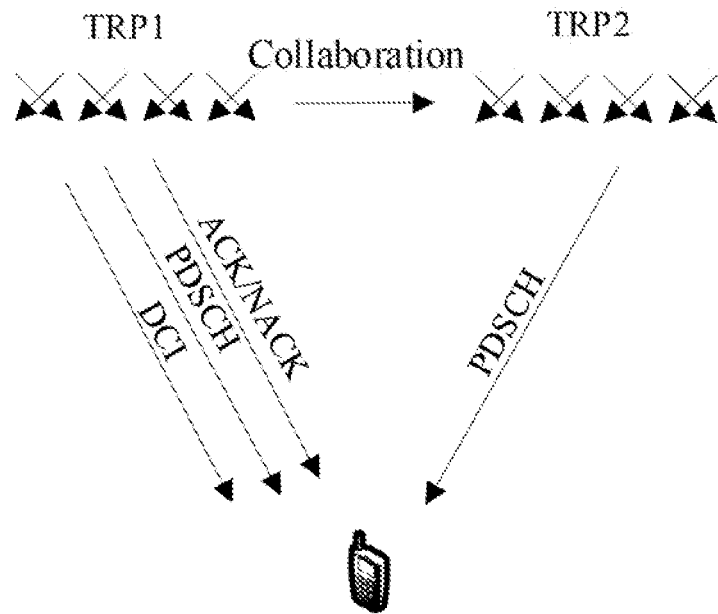
FIG. 6 is a schematic diagram of TRP-based PDSCH repetition transmission.

In order to improve the transmission reliability of PDSCH, repetition transmission of PDSCH is introduced into the NR, i.e., PDSCH carrying the same data is transmitted multiple times through different slots/TRPs/redundant versions, etc., so as to obtain a diversity gain and reduce the block error rate (BLER). Specifically, the repetition transmission may be performed in multiple slots (as shown in FIG. 5) or may be performed on multiple TRPs (as shown in FIG. 6). For a repetition of multiple slots, one DCI may schedule multiple PDSCHs carrying the same data to be transmitted on multiple consecutive slots, using the sane frequency domain resources, wherein the number of the slots is configured by higher layer signaling. For a repetition of multiple TRPs, the PDSCH carrying the same data is transmitted on different TRPs separately at the same time, and different beams may be used (in such a case, multiple TCI states need to be indicated in one DCI, wherein each TCI state is used for one repetition transmission). The repetition of multiple TRPs may also be combined with the mode of multiple slots, i.e., a same PDSCH is transmitted by consecutive slots, but using a different TRP in a different slot, and in such a case, the transmission in a different slot needs to use a different TCI state.

As to how the terminal device, when configured with multiple time domain resource units, performs PDSCH repetition transmission in the multiple time domain resource units, i.e., how the terminal device determines usable TCI states in the multiple time domain resource units, there is no relevant solution for reference at present.

Therefore, the present application proposes a method for transmitting data, which facilitate the terminal device, when configured with multiple time domain resource units, to determine a usable TCI state, as described in detail below.

FIG. 7 is a schematic block diagram of a method 200 for transmitting data according to an embodiment of the present application. As shown in FIG. 7, the method 200 includes some or all of the following contents.

In S210, a terminal device receives downlink control information (DCI), wherein the DCI is used for scheduling physical downlink shared channel (PDSCH) transmission in multiple time domain resource units, and the DCI is further used for indicating K transmission configuration indicator (TCI) states, and K is a positive integer.

In S220, the terminal device determines from the K TCI states a TCI state used for the PDSCH transmission in the multiple time domain resource units according to at least one of the following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units.

Specifically, as shown in FIG. 5, the network device configures, for the terminal device, multiple time domain resource units for repetition transmission. Here, the multiple time domain resource units may be configured by higher layer signaling or DCI signaling, for example, the higher layer signaling configures the number of the multiple time domain resource units, and the DCI signaling is used for scheduling the PDSCH transmission thereon. Moreover, scheduling information of the multiple time domain resource units may be carried in one DCI, and the DCI may also carry indication of K TCI states at the same time, for example, K is equal to 1, and in such a case, the terminal device may directly use the configured one TCI state for PDSCH transmission in the multiple time domain resource units, without making a selection. In another example, K>1, in such a case, the terminal device needs to select, from the K TCI states, a TCI state used for PDSCH in the multiple time domain resource units based on the above various information.

When K>1, that is, in addition to multiple time domain resource units, the terminal device is also configured with multiple TCI states at the same time, the terminal device may not only perform multi-TRP incoherent joint transmission in each time domain resource unit (in such a case, multiple TCI states are used in one time domain resource unit), but also perform multi-TRP diversity transmission in the multiple time domain resource units (in such a case, different TCI states may be used in different time domain resource units). In this case, the terminal device needs to determine which of the above transmission modes should be used, and further determine the TCI state used in the multiple time domain resource units.

It should be noted that when K>1, in addition to selection of one of the above two transmission modes, the terminal device may also use other transmission modes. For example, the terminal device may use multiple TCI states in each of a part of the configured multiple time domain resource units, and use different TCI states respectively in another part of time domain resource units, which is not limited by the embodiments of the present application.

Optionally, the indication of the K TCIs may also be decoupled from the scheduling information of the multiple time domain resource units. That is, the network device may schedule PDSCHs in the multiple time domain resource units to the terminal device through one DCI, and indicate the multiple TCI states to the terminal device through another signaling, such as RRC signaling, MAC signaling or DCI signaling.

As can be seen from the above, the TCI states are associated with TRPs and/or antenna panels. That is, different TRPs and/or panels are configured as different TCI states. When the network device configures multiple time domain resource units and multiple TCI states for the terminal device at the same time, i.e., the network device configures multiple time domain resource units and multiple TRPs and/or panels for the terminal device at the same time, the terminal device may select to use one TCI state in each time domain resource unit, and may use a different TCI state in a different time domain resource unit for PDSCH transmission, so as to improve the reliability of data transmission. The terminal device may also use multiple TCI states in each time domain resource unit, so that the purpose of diversity gain may be achieved.

Optionally, when the terminal device selects to use one TCI state in each time domain resource unit, the TCI state used in each time domain resource unit may also be the same, that is, the terminal device may use the same TRP for repetition transmission in multiple time domain resource units. For example, the network device configures TCI state 1 and TCI state 2 for the terminal device, and also configures time domain resource unit 1 and time domain resource unit 2, and the terminal device may use TCI state 1 for PDSCH transmission in both time domain resource unit 1 and time domain resource unit 2. Or, the number of configured TCI states is smaller than or equal to the number of configured time domain resource units, and the terminal device may make each TCI state correspond to a time domain resource unit in a one-to-one manner, and the remaining time domain resource units may respectively select one TCI state from the multiple TCI states for PDSCH transmission. For example, the network device configures TCI state 1 and TCI state 2 for the terminal device, and also configures time domain resource unit 1 and time domain resource unit 2, and the terminal device may use TCI state for PDSCH transmission in time domain resource unit 1 and use TCI state 2 for PDSCH transmission in time domain resource unit 2. In another example, the network device configures TCI state 1 and TCI state 2 for the terminal device, and also configures time domain resource unit 1, time domain resource unit 2 and time domain resource unit 3, and the terminal device may use TCI state 1 for PDSCH transmission in time domain resource unit 1, use TCI state 2 for PDSCH transmission in time domain resource unit 2 and use TCI state 1 for PDSCH transmission in time domain resource unit 3.

When the terminal device selects to use multiple TCI states in each time domain resource unit, the TCI states used in each time domain resource unit may be the same or different. For example, the network device configures TCI state 1, TCI state 2 and TCI state 3 for the terminal device, and also configures time domain resource unit 1, time domain resource unit 2, time domain resource unit 3 and time domain resource unit 4, and the terminal device may use TCI state 1, TCI state 2 and TCI state 3 in each of time domain resource unit 1, time domain resource unit 2, time domain resource unit 3 and time domain resource unit 4. In another example, the network device configures TCI state 1, TCI state 2 and TCI state 3 for the terminal device, and also configures time domain resource unit 1, time domain resource unit 2, time domain resource unit 3 and time domain resource unit 4, and the terminal device may use TCI state 1 and TCI state 2 for PDSCH transmission in time domain resource unit 1, use TCI state 2 and TCI state 3 for PDSCH transmission in time domain resource unit 2, use TCI state 1 and TCI state 3 for PDSCH transmission in time domain resource unit 3, and use TCI state 1, TCI state 2 and TCI state 3 for PDSCH transmission in time domain resource unit 4.

Further, after the terminal device selects TCI states for the multiple time domain resource units, it may further perform PDSCH detection according to the selected TCI states.

For example, the TCI state includes a QCL type and a QCL reference signal, and the terminal performs the PDSCH detection by using a large-scale parameter used for detecting the QCL reference signal according to the QCL type and the QCL reference signal used for PDSCH transmission in each time domain resource unit. The large-scale parameter is indicated by the QCL type.

Optionally, the embodiments of the present application may also be applied to other downlink channels or downlink signals such as PDCCHs. The time domain resource units in the embodiments of the present application may be slots or short slots. A short slot may also be referred to as a mini-slot, and includes at least one Orthogonal Frequency Division Multiplexing (OFDM) symbol.

Optionally, the terminal device may make a selection from two main transmission modes based on certain information. The two transmission modes are namely using one TCI state for PDSCH transmission in each time domain resource unit and using multiple TCI states for PDSCH transmission in each time domain resource unit, as mentioned above. For example, the terminal device may make a selection based on at least one of the following information: the number of CDM groups to which an adopted DMRS port belongs, a configuration of PDSCH repetition transmission scheme, a configuration scheme for the number of the multiple time domain resource units, a physical resource configuration in one time domain resource unit, etc. Detailed description will be given below in conjunction with the information one by one.

Optionally, the terminal device determines from the K TCI states a TCI state used for the PDSCH transmission in the multiple time domain resource units according to the number of CDM groups to which an adopted DMRS port belongs, which includes: if the number of CDM groups to which the adopted DMRS port belongs is 1, the terminal device determines that the PDSCH transmission in each of the multiple time domain resource units uses one of the K TCI states, wherein at least part of the multiple time domain resource units use different TCI states; and if the number of CDM groups to which the adopted DMRS port belongs is greater than 1, the terminal device determines that the PDSCH transmission in each of the multiple time domain resource units uses multiple TCI states among the K TCI states.

The number of the CDM groups to which the adopted DMRS port belongs indicates the number of CDM groups whose DMRS ports are included in the DMRS ports used by the terminal device. Specifically, if the number of the CDM groups to which the adopted DMRS port belongs is 1, it means that the DMRS port adopted by the terminal device only include DMRS ports in one CDM group; and if the number of CDM groups to which the adopted DMRS port belongs is greater than 1, it means that the DMRS port adopted by the terminal device includes DMRS ports in multiple CDM groups.

Optionally, the DMRS ports used by the terminal device may be indicated by the DCI scheduling the multiple time domain resource units. The DMRS ports included in multiple CDM groups may be agreed in advance between the network device and the terminal device, or configured to the terminal device by the network device. DMRS ports included in one CDM group are DMRS ports which occupy the same physical resources and are multiplexed by code division. Different CDM groups occupy different frequency domain resources, as shown in Table 1 and Table 2. For example, the first CDM group includes DMRS ports {0,1, 4,5}, and the second CDM group includes DMRS ports {2,3,6,7}. If the DMRS ports indicated by the DCI are {0,1}, the CDM group to which the DMRS ports currently used belong is the first CDM group, that is, the number of CDM groups is 1. If the DMRS ports indicated by the DCI are {0,2}, the CDM groups to which the DMRS ports currently used belong are the first and second CDM groups, that is, the number of CDM groups is 2.

For multiple time domain resource units, the PDSCH transmission on each time domain resource unit may use the same DMRS ports, i.e., use the DMRS ports indicated in the DCI. Further, the multiple time domain resource units may also use the same frequency domain resources, Modulation and Coding Scheme (MCS), etc.

TABLE 1

Correspondence relation between type 1 DMRS ports and CDM groups

| CDM group index | DMRS ports |
|---|---|
| 0 | {0, 1, 4, 5} |
| 1 | {2, 3, 6, 7} |

TABLE 2

Correspondence relation between type 2 DMRS ports and CDM groups

| CDM group index | DMRS ports |
|---|---|
| 0 | {0, 1, 6, 7} |
| 1 | {2, 3, 8, 9} |
| 2 | {4, 5, 10, 11} |

In an embodiment, if the DMRS ports indicated by the DCI only include DMRS ports in one CDM group, the PDSCH in each time domain resource unit uses one of the TCI states, and PDSCHs in different time domain resource units use different TCI states. In another embodiment, if the DMRS ports indicated by the DCI include DMRS ports in multiple CDM groups, the PDSCH in each time domain resource unit uses multiple TCI states, and the PDSCHs in different time domain resource units use the same TCI state. In a further embodiment, if the DMRS ports indicated by the DCI include DMRS ports in multiple CDM groups, the PDSCH in each time domain resource unit uses multiple TCI states, and the PDSCHs in different time domain resource units may use different TCI states. Among them, that the PDSCHs in different time domain resource units use different TCI states does not mean that each time domain resource unit has a different TCI state, rather, the TCI states may also be partially different. For example, if the number of the TCI states is smaller than the number of the time domain resource units, the TCI states used by a part of the multiple time domain resource units are different from those used by another part of the time domain resource units. In addition, when the number of CDM groups to which the DMRS ports used belong is greater than 1, the PDSCH in each time domain resource unit uses multiple TCI states, and the DMRS ports in one CDM group may correspond to a same one TCI state, while the DMRS ports in different CDM groups may correspond to different TCI states.

Figure 9:
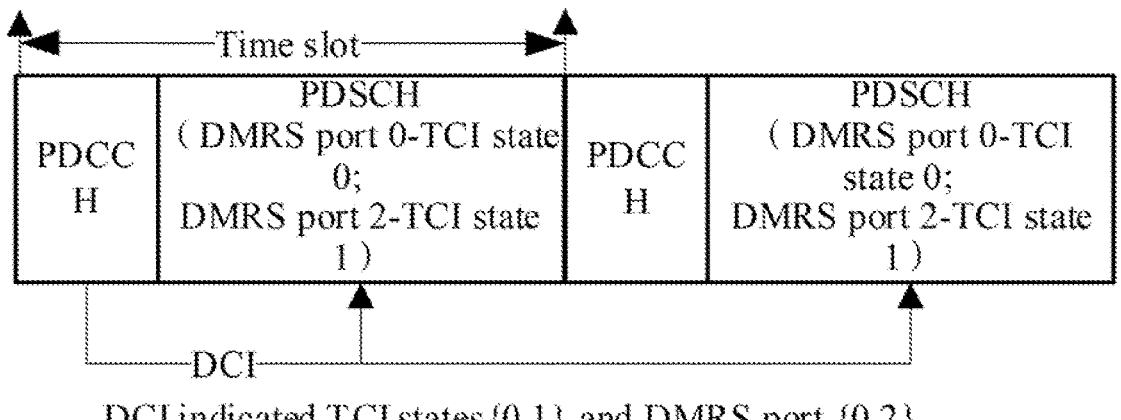
FIG. 9 is a schematic diagram of a TCI state mapping mode when the number of CDM groups is greater than 1.

For example, the multiple TCI states are two TCI states (TCI state 0 and TCI state 1) and the multiple time domain resource units are two slots, then when the DMRS ports indicated by the DCI are ports {0,1}, the terminal uses a different TCI state for the PDSCH transmission in each slot respectively, as shown in FIG. 8. When the DMRS ports indicated by the DCI are ports {0,2}, the terminal uses the two TCI states for the PDSCH transmission in each slot, and the TCI states corresponding to port 0 and port 2 are different, as shown in FIG. 9. The PDSCH transmission here means that the terminal side detects PDSCH.

Figure 10:
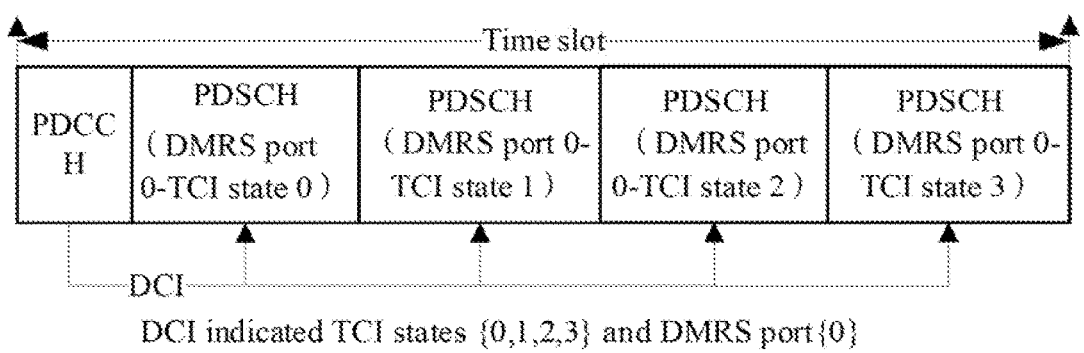
FIG. 10 is another schematic diagram of a TCI state mapping mode when the number of CDM groups is equal to 1.
Figure 11:
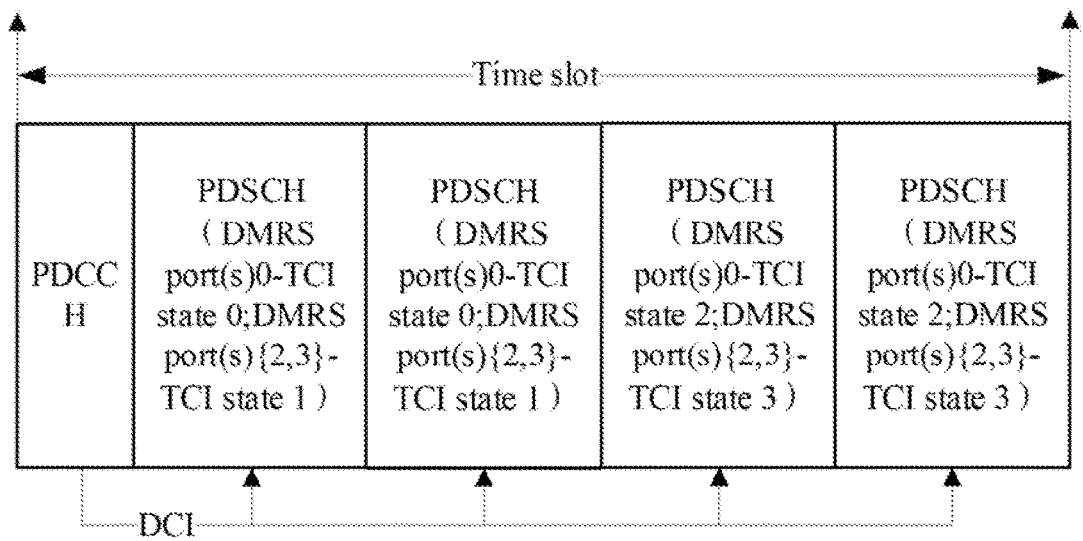
FIG. 11 is another schematic diagram of a TCI state mapping mode when the number of CDM groups is greater than 1.

In another example, the multiple TCI states are four TCI states (TCI state 0, TCI state 1, TCI state 2 and TCI state 3), and the multiple time domain resource units are four short slots each occupying three OFDM symbols, then when the DMRS port indicated by the DCI is port {0}, the terminal uses a different TCI state for the PDSCH transmission in each short slot, that is, the TCI states used by the four short slots are different from each other, as shown in FIG. 10. When the DMRS ports indicated by the DCI are ports {0,2,3}, the terminal uses the first two TCI states of the four TCI states in each of the first two short slots, and uses the last two TCI states of the four TCI states in each of the last two short slots, as shown in FIG. 11. Port 0 and ports 2, 3 belong to different CDM groups respectively, and may use different TCI states.

Determining the TCI state for each time domain resource unit according to the number of CDM groups corresponding to the DMRS ports may ensure that when multiple TCI states are used for one time domain resource unit, different TCI states may correspond to different CDM groups, thereby improving channel estimation performance of the DMRS. Moreover, since the number of DMRS ports for diversity transmission is usually very small, using a single CDM group to indicate diversity transmission of multiple slots may save signaling overhead without limiting the scheduling flexibility of the base station.

Optionally, the terminal device determines from the K TCI states a TCI state used for the PDSCH transmission in the multiple time domain resource units according to the configuration of PDSCH repetition transmission scheme, which includes: if the configuration of PDSCH repetition transmission scheme indicates repetition between time resource units, the terminal device determines that the PDSCH transmission in each of the multiple time domain resource units uses one of the K TCI states, wherein at least as part of the multiple time domain resource units use different TCI states; and if the configuration of PDSCH repetition transmission scheme indicates repetition within a time domain resource unit, the terminal device determines that the PDSCH transmission in each of the multiple time domain resource units uses multiple TCI states among the K TCI states.

The so-called repetition transmission scheme may refer to repetition within a time domain resource unit or repetition between time resource units, or the repetition transmission scheme may refer to whether to use the repetition within a time domain resource unit, or the repetition transmission scheme may refer to whether to use the repetition between time resource units. The configuration of repetition transmission scheme may be notified to the terminal device by the network device through higher layer signaling or DCI signaling. This configuration may be used to indicate the repetition transmission scheme used by the terminal device, e.g., whether to perform multi-TRP based PDSCH repetition transmission in one time domain resource unit or perform multi-TRP based PDSCH repetition transmission between multiple time domain resource units. Specifically, if the configuration of repetition transmission scheme indicates repetition within a time domain resource unit, the PDSCH in each of the multiple time domain resource units uses multiple TCI states, and the PDSCHs in different time domain resource units use the same TCI state. If the configuration of repetition transmission scheme indicates the repetition between time resource units (for example, the repetition within a time domain resource unit is turned off), the PDSCH in each of the multiple time domain resource units uses one of the TCI states, and the PDSCHs in different time domain resource units use different TCI states.

Figure 12:
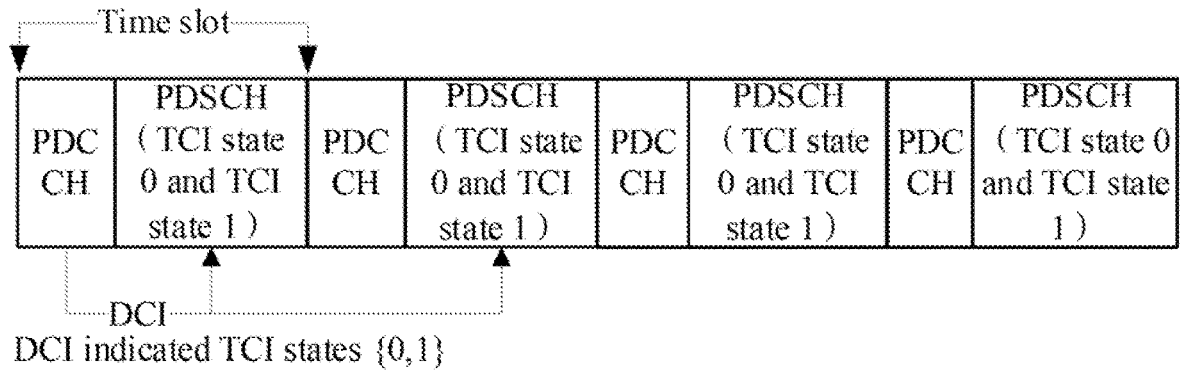
FIG. 12 is a schematic diagram of a TCI state mapping mode when repetition within a slot is configured.
Figure 13:
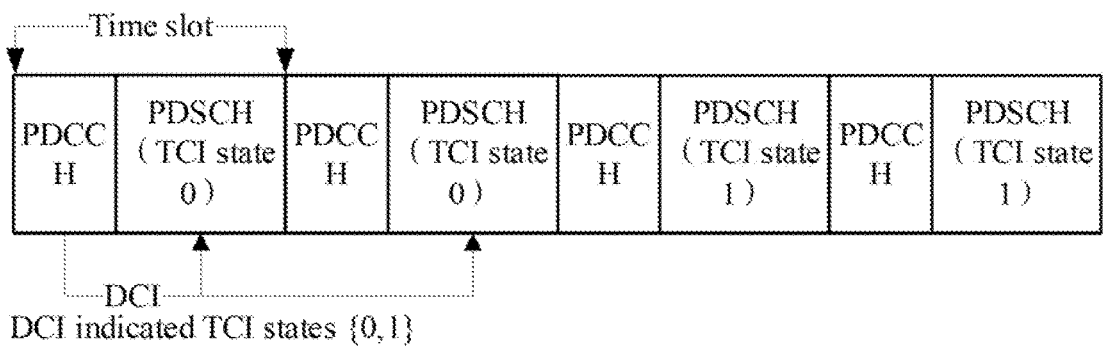
FIG. 13 is a schematic diagram of a TCI state mapping mode when repetition between slots is configured.

For example, the multiple TCI states are two TCI states (TCI state 0 and TCI state 1), and the multiple time domain resource units are four slots. If the configuration of repetition transmission scheme indicates the repetition within a slot, the terminal uses the two TCI states for the PDSCH transmission in each slot, as shown in FIG. 12. If the configuration of repetition transmission scheme indicates repetition between slots, the terminal uses a first TCI for the PDSCH transmission in the first two slots and uses the second TCI state for the PDSCH transmission in the last two slots, as shown in FIG. 13.

According to the configuration of multiplexing transmission mode, the terminal device may determine whether to perform multi-TRP transmission in a slot or a mini-slot, and further determine whether multiple slots or mini-slots use a same TCI state. The network device may configure the mode of multi-TRP transmission according to service types, thereby flexibly supporting different service types.

Optionally, the terminal device determines from the K TCI states a TCI state used for the PDSCH transmission in the multiple time domain resource units according to the configuration scheme for the number of the multiple time domain resource units, which includes: if the number of the multiple time domain resource units is a number indicated by the DCI, the terminal device determines that the PDSCH transmission in each of the multiple time domain resource units uses one of the K TCI states, wherein at least a part of the multiple time domain resource units use different TCI states; and if the number of the multiple time domain resource units is a number configured by higher layer signaling, the terminal device determines that the PDSCH transmission in each of the multiple time domain resource units uses multiple TCI states among the K TCI states.

The number of the multiple time domain resource units may be preferably agreed by the terminal device and the network device in advance, or may be configured by the network device through higher layer signaling, or may be configured through the DCI. For example, the network device may pre-configure a value of the number through higher layer signaling (for example, indicated through RRC signaling PDSCH-aggregation). If the DCI does not configure the number, the terminal device uses the value configured by the higher layer signaling as the number of the multiple time domain resource units. If the DCI indicates the value of the number (e.g., through a Repetition Number indication field in the DCI), the terminal device uses the value indicated by the DCI as the number of the multiple time domain resource units.

If the number of the multiple time domain resource units is configured through the higher layer signaling, for example, the network device does not indicate the number of the multiple time domain resource units through the DCI, the PDSCH in each time domain resource unit uses multiple TCI states, and the PDSCHs in different time domain resource units use the same TCI state. If the number of the multiple time domain resource units is configured by the DCI, the PDSCH in each time domain resource unit uses one of the TCI states, and the PDSCHs in different time domain resource units use different TCI states.

Optionally, the number of time domain resource units may be indicated to the terminal device together with a time frequency resource configuration of the multiple time domain resource units.

When the number of the multiple time domain resource units is configured by the higher layer signaling, the terminal device may use a default behavior, i.e., the multiple time domain resource units use the same transmission mode (which is the same as the behavior in the previous protocol version), so as to support conventional services. If the current transmission has higher reliability requirements, the number may be updated through the DCI. In such a case, the terminal may perform multi-TRP diversity transmission between slots (i.e., different time domain resource units use different TCI states), so as to further improve the reliability.

Optionally, the terminal device determines from the K TCI states a TCI state used for the PDSCH transmission in the multiple time domain resource units according to the physical resource configuration in one time domain resource unit of the multiple time domain resource units, which includes: if the physical resource configuration indicates that one frequency domain resource set is used for PDSCH transmission in one time domain resource unit, the terminal device determines that the PDSCH transmission in each of the multiple time domain resource units uses one of the K TCI states, at least a part of the multiple time domain resource units use different TCI states; and if the physical resource configuration indicates that multiple non-overlapping frequency domain resource sets are used for PDSCH transmission in one time domain resource unit, the terminal device determines that the PDSCH transmission in each of the multiple time domain resource units uses multiple TCI states among the K TCI states.

Specifically, the physical resource configuration in one time domain resource unit refers to the physical resource configuration in one time domain resource unit among the multiple time domain resource units, and different time domain resource units may use the same physical resource configuration. Specifically, the physical resource configuration may be used to indicate the frequency domain resources used for the PDSCH transmission. One frequency domain resource set here may include multiple consecutive or discrete Physical Resource Blocks (PRB) for transmitting one PDSCH or one transport layer of a PDSCH (i.e., different transport layers use different frequency domain resource sets). For example, the physical resource configuration may indicate multiple frequency domain resource sets for repetition transmission of a same PDSCH, the physical resource configuration and may also indicate one frequency domain resource set for transmitting the PDSCH once.

If the physical resource configuration indicates that the multiple non-overlapping frequency domain resource sets are used for PDSCH transmission in one time domain resource unit, the PDSCH in each time domain resource unit uses multiple TCI states, and the PDSCHs in different time domain resource units use the same TCI state. Further, the PDSCHs on the multiple non-overlapping frequency domain resource sets are transmitted using different TCI states, if the physical resource configuration indicates that one frequency domain resource set is used for PDSCH transmission in one time domain resource unit, the PDSCH in each time domain resource unit uses one of the TCI states, and the PDSCHs in different time domain resource units use different TCI states.

Further, the PDSCHs on the multiple non-overlapping frequency domain resource sets are transmitted using different TCI states.

Figure 14:
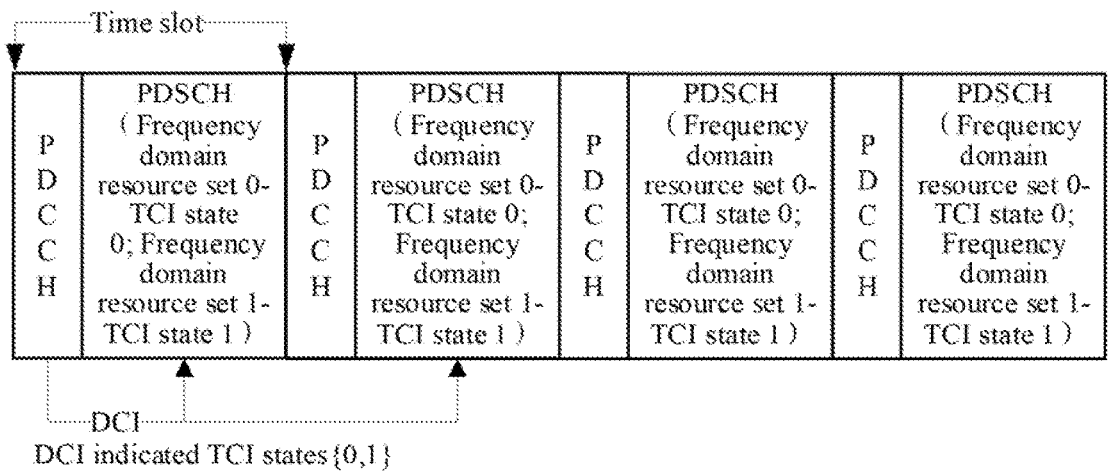
FIG. 14 is a schematic diagram of a TCI state mapping mode when two frequency domain resource sets are configured in one slot.
Figure 15:
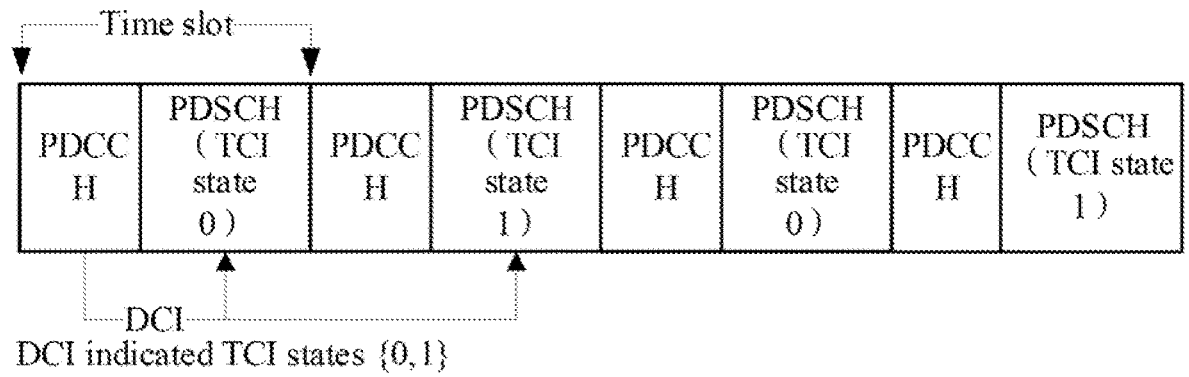
FIG. 15 is a schematic diagram of a TCI state mapping mode when one frequency domain resource set is configured in one slot.

For example, the multiple TCI states are two TCI states (TCI state 0 and TCI state 1), and the multiple time domain resource units are four slots. If the physical resource configuration indicates that two non-overlapping frequency domain resource sets are used for PDSCH transmission in one slot, the terminal device uses different TCI states for PDSCH repetition transmission in the two frequency domain resource sets, and uses the same TCI states in different slots, as shown in FIG. 14. If the physical resource configuration indicates that one frequency domain resource set is used for the PDSCH transmission in one slot, the terminal device uses one of the TCI states for the PDSCH transmission in each slot, and uses different TCI states in the slots, for example, using TCI state 0 in the first and third time domain resource units and using TCI state 1 in the second and fourth time domain resource units, as shown in FIG. 15.

Therefore, according to the method of the embodiment of the present application, the terminal device may determine, according to the configuration information of the network device, how to use the indicated multiple TCI states, i.e., whether to use multiple TCI states in one slot or use multiple TCI states in multiple slots, so as to support two different modes of diversity transmission and multiplexing transmission. For different service types (e.g., Enhanced Mobile Broadband (eMBB) and Ultra-reliable Low-latency Communication (URLLC)), different modes may be adopted to meet the corresponding requirements (e.g., using multiplexing transmission for eMBB to obtain throughput, and using diversity transmission for URLLC services to obtain reliability).

In addition, the method of the embodiment of the present application does not require introduction of new signaling, but the two modes can be distinguished according to the existing configuration information, thus saving signaling overhead.

It should be understood that the interaction with the terminal device, related characteristics, functions, etc. of the network device correspond to related characteristics and functions of the terminal device. Moreover, the related contents have been described in detail in the method 200, which will not be repeated here for brevity.

It should also be understood that sequence numbers of the foregoing processes do not mean execution sequences in the various embodiments of the present application. The execution sequences of the processes should be determined according to functions and internal logic of the processes, and should not constitute any limitation on the implementation processes of the embodiments of the present application.

The method for transmitting data according to an embodiment of the present application has been described in detail above, and an apparatus for transmitting data according to an embodiment of the present application will be described below with reference to FIGS. 16 and 17. The technical features described in the method embodiments are applicable to the following apparatus embodiments.

Figure 16:
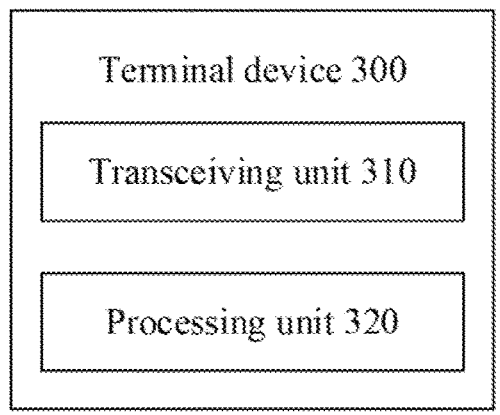
FIG. 16 is another schematic block diagram of a terminal device according to an embodiment of the present application.

FIG. 16 is a schematic block diagram of a terminal device 300 according to an embodiment of the present application. As shown in FIG. 16, the terminal device 300 includes:

a transceiving unit 310, configured to receive downlink control information (DCI), wherein the DCI is used for scheduling physical downlink shared channel (PDSCH) transmission in multiple time domain resource units, and the DCI is further used for indicating K transmission configuration indicator (TCI) states, and K is a positive integer;

a processing unit 320, configured to determine from the K TCI states a TCI state used for the PDSCH transmission in the multiple time domain resource units according to at least one of the following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units.

Optionally, in an embodiment of the present application, K is a positive integer greater than 1, and the processing unit is specifically configured to: if the number of CDM groups to which the adopted DMRS port belongs is 1, determine that the PDSCH transmission in each of the multiple time domain resource units uses one of the K TCI states, wherein at least a part of the multiple time domain resource units use different TCI states; and if the number of CDM groups to which the adopted DMRS port belongs is greater than 1, determine that the PDSCH transmission in each of the multiple time domain resource units uses multiple TCI states among the K TCI states.

Optionally, in an embodiment of the present application, in the case of the determining that the PDSCH transmission in each time domain resource unit uses multiple TCI states among the K TCI states, DMRS ports in different CDM groups use different TCI states among the multiple TCI states.

Optionally, in an embodiment of the present application, the DCI is also used for indicating the DMRS ports used by the terminal device.

Optionally, in an embodiment of the present application, K is a positive integer greater than 1, and the processing unit is specifically configured to: if the configuration of PDSCH repetition transmission scheme indicates repetition between time resource units, determine that the PDSCH transmission in each of the multiple time domain resource units uses one of the K TCI states, wherein at least a part of the multiple time domain resource units use different TCI states; and if the configuration of PDSCH repetition transmission scheme indicates repetition within a time domain resource unit, determine that the PDSCH transmission in each of the multiple time domain resource units uses multiple TCI states among the K TCI states.

Optionally, in an embodiment of the present application, K is a positive integer greater than 1, and the processing unit is specifically configured to: if the number of the multiple time domain resource units is configured through the DCI, determine that the PDSCH transmission in each of the multiple time domain resource units uses one of the K TCI states, wherein at least a part of the multiple time domain resource units use different TCI states; and if the number of the multiple time domain resource units is configured through higher layer signaling, determine that the PDSCH transmission in each of the multiple time domain resource units uses multiple TCI states among the K TCI states.

Optionally, in an embodiment of the present application, K is a positive integer greater than 1, and the processing unit is specifically configured to: if the physical resource configuration indicates that one frequency domain resource set is used for PDSCH transmission in one time domain resource unit, determine that the PDSCH transmission in each of the multiple time domain resource units uses one of the K TCI states, wherein at least a part of the multiple time domain resource units use different TCI states; and if the physical resource configuration indicates that multiple non-overlapping frequency domain resource sets are used for PDSCH transmission in one time domain resource unit, determine that the PDSCH transmission in each of the multiple time domain resource units uses multiple TCI states among the K TCI states.

Optionally, in an embodiment of the present application, in the case where the terminal device determines that the PDSCH transmission in each time domain resource unit uses multiple TCI states among the K TCI states, the TCI states used for PDSCH transmission on the multiple frequency domain resource sets in one time domain resource unit are different.

Optionally, in an embodiment of the present application, the processing unit is specifically configured to determine that the PDSCH transmission in each of the multiple time domain resource units uses the K TCI states.

Optionally, in an embodiment of the present application, the DMRS ports used for PDSCH transmission in the multiple time domain resource units are the same.

Optionally, in an embodiment of the present application, the time domain resource units are slots or short slots, and a short slot includes at least one orthogonal frequency division multiplexing (OFDM) symbol.

Optionally, in an embodiment of the present application, the processing unit is further configured to perform PDSCH detection in each of the multiple time domain resource units according to the TCI states used for PDSCH transmission in the multiple time domain resource units.

Optionally, in an embodiment of the present application, a TCI state includes a quasi co-location (QCL) type and a QCL reference signal, and the processing unit is specifically configured to perform the PDSCH detection in corresponding time domain resource units according to a large-scale parameter used by the QCL reference signal used in each of the multiple time domain resource units, wherein the large-scale parameter is indicated by the QCL type.

It should be understood that the terminal device 300 according to the embodiments of the present application may correspond to the terminal device in the method embodiments of the present application, and the above-mentioned and other operations and/or functions of various units in the terminal device 300 are respectively for implementing the corresponding processes of the terminal device in the method shown in FIG. 7, which will not be repeated here for brevity.

Figure 17:
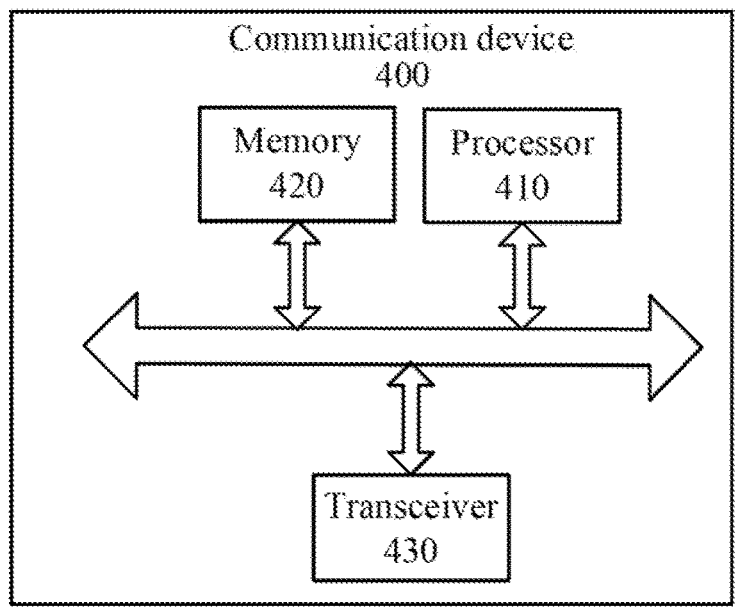
FIG. 17 is a schematic block diagram of a chip according to an embodiment of the present application.

FIG. 17 is a schematic diagram of a structure of a communication device 400 according to an embodiment of the present application. The communication device 400 shown in FIG. 17 includes a processor 410 that may call and run a computer program from a memory to implement a method in an embodiment of the present application.

Optionally, as shown in FIG. 17, the communication device 400 may further include a memory 420. The processor 410 may call and run a computer program from the memory 420 to implement a method in an embodiment of the present application.

The memory 420 may be a separate device independent of the processor 410 or may be integrated in the processor 410.

Optionally, as shown in FIG. 17, the communication device 400 may further include a transceiver 430, and the processor 410 may control the transceiver 430 to communicate with another device. Specifically, the transceiver 430 may send information or data to another device or receive information or data sent by another device.

The transceiver 430 may include a transmitter and a receiver. The transceiver 430 may further include antennas, and the number of the antennas may be one or more.

Optionally, the communication device 400 may specifically be the terminal device of the embodiments of the present application, and the communication device 400 may implement the corresponding processes implemented by the terminal device in various methods of the embodiments of the present application, which will not be repeated here for brevity.

Figure 18:
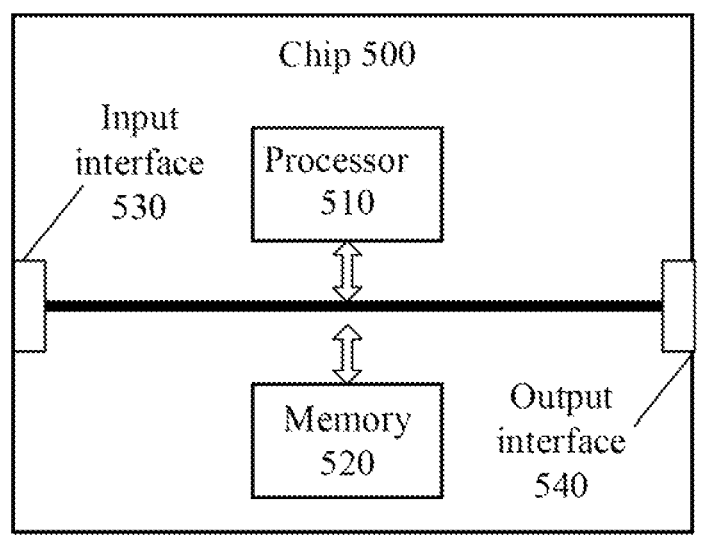
FIG. 18 is a schematic block diagram of a communication system according to an embodiment of the present application.

FIG. 18 is a schematic diagram of a structure of a chip according to an embodiment of the present application. The chip 500 shown in FIG. 18 includes a processor 510. The processor 510 may call and run a computer program from a memory to implement a method in an embodiment of the present application.

Optionally, as shown in FIG. 18, the chip 500 may further include a memory 520. The processor 510 may call and run a computer program from the memory 520 to implement a method in an embodiment of the present application.

The memory 520 may be a separate device independent of the processor 510 or may be integrated in the processor 510.

Optionally, the chip 500 may further include an input interface 530. The processor 510 may control the input interface 530 to communicate with another device or chip. Specifically, the processor 510 may acquire information or data sent by another device or chip.

Optionally, the chip 500 may further include an output interface 540. The processor 510 may control the output interface 540 to communicate with another device or chip. Specifically, the processor 510 may output information or data to another device or chip.

Optionally, the chip may be applied to a terminal device in an embodiment of the present application, and the chip may implement the corresponding processes implemented by the terminal device in various methods of the embodiments of the present application, which will not be repeated here for brevity.

It should be understood that the chip mentioned in the embodiment of the present application may also be referred to as a system-level chip, a system chip, a chip system or a system-on-chip, etc.

It should be understood that the processor in the embodiment of the present application may be an integrated circuit chip having a signal processing capability. In an implementation process, each of the acts of the foregoing method embodiments may be completed through an integrated logic circuit of hardware in the processor or instructions in a form of software. The processor above may be a general purpose processor, a Digital Signal Processor (DSP), an Application Specific Integrated Circuit (ASIC), a Field Programmable Gate Array (FPGA) or other programmable logic device, a discrete gate or a transistor logic device, or a discrete hardware component, which may implement or perform various methods, acts and logical block diagrams disclosed in the embodiments of the present application. The general purpose processor may be a microprocessor, or the processor may also be any conventional processor or the like. The acts of the methods disclosed with reference to the embodiments of the present application may be directly implemented to be completed by a hardware decoding processor, or may be implemented by a combination of the hardware in the decoding processor and software modules. The software modules may be located in a storage medium commonly used in the art, such as a random access memory, a flash memory, a read-only memory, a programmable read-only memory, an electrically erasable programmable memory, or a register, etc. The storage medium is located in the memory, and the processor reads the information in the memory and completes the acts of the foregoing methods in combination with its hardware.

It may be understood that the memory in the embodiment of the present application may be a volatile memory or a non-volatile memory, or may include both a volatile memory and a non-volatile memory. The non-volatile memory may be a Read-only Memory (ROM), a Programmable ROM (PROM), an Erasable PROM (EPROM), an electrically EPROM (EEPROM), or a flash memory. The volatile memory may be a Random Access Memory (RAM), which is used as an external cache. Through exemplary but non-restrictive description, many forms of RAMs may be used, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that the memory in the systems and methods described in this specification intends to include, but not limited to, these and any other suitable types of memories.

It should be understood that the description of the above memories is exemplary but not restrictive. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), a Direct Rambus RAM (DR RAM), or the like. That is, memories in the embodiments of the present application are intended to include, but are not limited to, these and any other suitable types of memories.

An embodiment of the present application further provides a computer readable storage medium configured to store a computer program.

Optionally, the computer readable storage medium may be applied to a network device in an embodiment of the present application, and the computer program enables a computer to perform the corresponding processes implemented by the network device in various methods of the embodiments of the present application, which will not be repeated here for brevity.

Optionally, the computer readable storage medium may be applied to a mobile terminal/terminal device in an embodiment of the present application, and the computer program enables a computer to perform the corresponding processes implemented by the mobile terminal/terminal device in various methods of the embodiments of the present application, which will not be repeated here for brevity.

An embodiment of the present application further provides a computer program product, including computer program instructions.

Optionally, the computer program product may be applied to a network device in an embodiment of the present application, and the computer program instructions cause a computer to perform the corresponding processes implemented by the network device in various methods of the embodiments of the present application, which will not be repeated here for brevity.

Optionally, the computer program product may be applied to a mobile terminal/terminal device in an embodiment of the present application, and the computer program instructions cause a computer to perform the corresponding processes implemented by the mobile terminal/terminal device in various methods of the embodiments of the present application, which will not be repeated here for brevity.

An embodiment of the present application further provides a computer program.

Optionally, the computer program may be applied to a network device in an embodiment of the present application, and when run on a computer, the computer program enables the computer to perform the corresponding processes implemented by the network device in various methods of the embodiments of the present application, which will not be repeated here for brevity.

Optionally, the computer program may be applied to a terminal device in an embodiment of the present application, and when run on a computer, the computer program enables the computer to perform the corresponding processes implemented by the terminal device in various methods of the embodiments of the present application, which will not be repeated here for brevity.

Those of ordinary skills in the art will recognize that the exemplary elements and algorithm acts described in combination with the embodiments disclosed herein may be implemented in form of electronic hardware, or a combination of computer software and electronic hardware. Whether these functions are implemented in form of hardware or software depends on the specific application and design constraints of the technical scheme. Those skilled in the art may use different methods to implement the described functions in respect to each particular application, but such implementation should not be considered to be beyond the scope of the present application.

Those skilled in the art may clearly understand that for convenience and conciseness of description, for the specific working processes of the systems, apparatuses and units described above, reference may be made to the corresponding processes in the forgoing method embodiments, which will not be repeated herein.

In several embodiments provided by the present application, it should be understood that the disclosed systems, apparatuses and methods may be implemented in other ways. For example, the apparatus embodiments described above are only illustrative, for example, the division of the units is only a logical function division, and there may be other division manners in actual implementations. For example, multiple units or components may be combined or integrated into another system, or some features may be ignored or not executed. On the other hand, the mutual coupling or direct coupling or communication connection shown or discussed may be an indirect coupling or communication connection through some interfaces, apparatuses or units, which may be in electrical, mechanical or other forms.

A unit described as a separate component may or may not be physically separated, and a component shown as a unit may or may not be a physical unit, i.e., it may be located in one place or may be distributed across multiple network units. Some or all of the units may be selected according to actual needs to achieve the purpose of the solutions of the embodiments.

In addition, various functional units in various embodiments of the present application may be integrated into one processing unit, or the various units may be physically present separately, or two or more than two units may be integrated into one unit.

The functions may be stored in a computer readable storage medium if achieved in a form of software functional unit and sold or used as an independent product. Based on such understanding, the technical solution of the present application, in essence, or the part contributing to the prior art, or the part of the technical solution, may be embodied in the form of a software product stored in a storage medium, including a number of instructions for enabling a computer device (which may be a personal computer, a server, or a network device, etc.) to perform all or part of the acts of the methods described in various embodiments of the present application. The foregoing storage medium includes: any medium that can store program codes, such as a USB flash disk, a mobile hard disk, a Read-only Memory (ROM), a Random Access Memory (RAM), a magnetic disk, or an optical disk.

What are described above are merely specific implementations of the present application, but the protection scope of the present application is not limited thereto. Any variation or substitution that may easily conceived by a person familiar with the art within the technical scope disclosed by the present application shall be included within the protection scope of the present application. Therefore, the protection scope of the present application shall be subject to the protection scope of the claims.

The invention claimed is:

1. A method for transmitting data, comprising:
  receiving, by a terminal device, downlink control information (DCI), wherein the DCI is used for scheduling physical downlink shared channel (PDSCH) transmission in multiple time domain resource units, and the DCI is further used for indicating K transmission configuration indicator (TCI) states, and K is a positive integer; and
  determining, by the terminal device, from the K TCI states, a TCI state used for the PDSCH transmission in the multiple time domain resource units according to at least one of following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units,
  wherein K is a positive integer greater than 1, and determining, by the terminal device, from the K TCI states, the TCI state used for the PDSCH transmission in the multiple time domain resource units according to the number of CDM groups to which the adopted DMRS port belongs comprises:
  for the adopted DMRS port belonging to a single CDM group, determining, by the terminal device, that PDSCH transmission in each of the multiple time domain resource units uses one of the K TCI states, at least a part of the multiple time domain resource units using different TCI states; and
  for the adopted DMRS port belonging to more than one CDM groups, determining, by the terminal device, that one PDSCH transmission in each of the multiple time domain resource units uses multiple TCI states among the K TCI states;
  wherein when it is determined that the one PDSCH transmission in each time domain resource unit uses multiple TCI states among the K TCI states, DMRS ports in different CDM groups use different TCI states among the multiple TCI states.

2. The method of claim 1, wherein the DCI is further used for indicating the DMRS port adopted by the terminal device.

3. The method of claim 1, wherein K is a positive integer greater than 1, and determining, by the terminal device, from the K TCI states, the TCI state used for the PDSCH transmission in the multiple time domain resource units according to the configuration of PDSCH repetition transmission scheme comprises:
  if the configuration of PDSCH repetition transmission scheme indicates repetition between time domain resource units, determining, by the terminal device, that PDSCH transmission in each of the multiple time domain resource units uses one of the K TCI states, at least a part of the multiple time domain resource units using different TCI states; and
  if the configuration of PDSCH repetition transmission scheme indicates repetition within a time domain resource unit, determining, by the terminal device, that the PDSCH transmission in each of the multiple time domain resource units uses multiple TCI states among the K TCI states.

4. The method of claim 1, wherein K is a positive integer greater than 1, and determining, by the terminal device, from the K TCI states, the TCI state used for the PDSCH transmission in the multiple time domain resource units according to the configuration scheme for the number of the multiple time domain resource units comprises:
  if the number of the multiple time domain resource units is configured through the DCI, determining, by the terminal device, that PDSCH transmission in each of the multiple time domain resource units uses one of the K TCI states, at least a part of the multiple time domain resource units using different TCI states; and
  if the number of the multiple time domain resource units is configured through higher layer signaling, determining, by the terminal device, that the PDSCH transmission in each of the multiple time domain resource units uses multiple TCI states among the K TCI states.

5. The method of claim 1, wherein determining, by the terminal device, that the PDSCH transmission in each of the multiple time domain resource units uses multiple TCI states among the K TCI states comprises:
  determining, by the terminal device, that the PDSCH transmission in each of the multiple time domain resource units uses the K TCI states.

6. The method of claim 1, wherein the DMRS ports used for the PDSCH transmission in the multiple time domain resource units are the same.

7. The method of claim 1, wherein the time domain resource units are slots or mini-slots, and a mini-slot comprises at least one orthogonal frequency division multiplexing (OFDM) symbol.

8. A terminal device, comprising:
  a transceiver configured to receive downlink control information (DCI), wherein the DCI is used for scheduling physical downlink shared channel (PDSCH) transmission in multiple time domain resource units, and the DCI is further used for indicating K transmission configuration indicator (TCI) states, and K is a positive integer; and
  a processor configured to determine, from the K TCI states, a TCI state used for the PDSCH transmission in the multiple time domain resource units according to at least one of following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units,
  wherein K is a positive integer greater than 1, and the processor is specifically configured to:

for the adopted DMRS port belonging to a single CDM group, determine that PDSCH transmission in each of the multiple time domain resource units uses one of the K TCI states, wherein at least a part of the multiple time domain resource units uses different TCI states; and for the adopted DMRS port belonging to more than one CDM groups, determine that one PDSCH transmission in each of the multiple time domain resource units uses multiple TCI states among the K TCI states;

wherein when it is determined that the one PDSCH transmission in each time domain resource unit uses multiple TCI states among the K TCI states, DMRS ports in different CDM groups use different TCI states among the multiple TCI states.

9. The terminal device of claim 8, wherein the DCI is further used for indicating the DMRS port adopted by the terminal device.

10. The terminal device of claim 8, wherein K is a positive integer greater than 1, and the processor is specifically configured to:

if the configuration of PDSCH repetition transmission scheme indicates repetition between time domain resource units, determine that PDSCH transmission in each of the multiple time domain resource units uses one of the K TCI states, wherein at least a part of the multiple time domain resource units use different TCI states; and if the configuration of PDSCH repetition transmission scheme indicates repetition within a time domain resource unit, determine that the PDSCH transmission in each of the multiple time domain resource units uses multiple TCI states among the K TCI states.

11. The terminal device of claim 8, wherein K is a positive integer greater than 1, and the processor is specifically configured to:

if the number of the multiple time domain resource units is configured through the DCI, determine that PDSCH transmission in each of the multiple time domain resource units uses one of the K TCI states, wherein at least a part of the multiple time domain resource units use different TCI states; and if the number of the multiple time domain resource units is configured through higher layer signaling, determine that the PDSCH transmission in each of the multiple time domain resource units uses multiple TCI states among the K TCI states.

12. The terminal device of claim 8, wherein the processor is specifically configured to:

determine that the PDSCH transmission in each of the multiple time domain resource units uses the K TCI states.

13. The terminal device of claim 8, wherein the DMRS ports used for the PDSCH transmission in the multiple time domain resource units are the same.

14. The terminal device of claim 8, wherein the time domain resource units are slots or mini-slots, and a mini-slot comprises at least one orthogonal frequency division multiplexing (OFDM) symbol.

15. A network device, comprising:

a transceiver configured to transmit downlink control information (DCI) to a terminal device, wherein the DCI is used for scheduling physical downlink shared channel (PDSCH) transmission in multiple time domain resource units, and the DCI is further used for indicating K transmission configuration indicator (TCI) states, and K is a positive integer;

wherein the transceiver is further configured to indicate at least one of following information: the number of code division multiplexing (CDM) groups to which an adopted demodulation reference signal (DMRS) port belongs, a configuration of PDSCH repetition transmission scheme, a configuration scheme for the number of the multiple time domain resource units, and a physical resource configuration in one time domain resource unit of the multiple time domain resource units, for the terminal device to determine from the K TCI states, a TCI state used for the PDSCH transmission in the multiple time domain resource units, wherein K is a positive integer greater than 1, for the adopted DMRS port belonging to a single CDM group, that PDSCH transmission in each of the multiple time domain resource units uses one of the K TCI states is determined by the terminal device, wherein at least a part of the multiple time domain resource units uses different TCI states; and for the adopted DMRS port belonging to more than one CDM groups, that one PDSCH transmission in each of the multiple time domain resource units uses multiple TCI states among the K TCI states id determined by the terminal device;

wherein when it is determined that the one PDSCH transmission in each time domain resource unit uses multiple TCI states among the K TCI states, DMRS ports in different CDM groups use different TCI states among the multiple TCI states.

16. The network device of claim 15, wherein the DCI is further used for indicating a demodulation reference signal (DMRS) port adopted by the terminal device.

* * * * *